(12) United States Patent
Kim et al.

(10) Patent No.: US 11,731,467 B2
(45) Date of Patent: Aug. 22, 2023

(54) INSERT RUBBER FOR IMPROVING AERODYNAMICS OF TIRE AND INSTALLATION METHOD THEREOF

(71) Applicants: HYUNDAI MOTOR COMPANY, Seoul (KR); KIA MOTORS CORPORATION, Seoul (KR)

(72) Inventors: Hyo-Sik Kim, Hwaseong-si (KR); Tae-Seok Lee, Ulsan (KR); Dae-Chul Jang, Suwon-si (KR); Jae-Hun Lee, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 567 days.

(21) Appl. No.: 16/871,453

(22) Filed: May 11, 2020

(65) Prior Publication Data

US 2021/0276371 A1 Sep. 9, 2021

(30) Foreign Application Priority Data

Mar. 4, 2020 (KR) .......................... 10-2020-0027130

(51) Int. Cl.
*B60C 15/024* (2006.01)
*B60B 21/12* (2006.01)

(52) U.S. Cl.
CPC ............ *B60C 15/024* (2013.01); *B60B 21/12* (2013.01); *B60B 2900/1216* (2013.01)

(58) Field of Classification Search
CPC ..... B60C 15/02; B60C 15/023; B60C 15/024; B60C 15/23
See application file for complete search history.

(56) References Cited

U.S. PATENT DOCUMENTS

| | | | | |
|---|---|---|---|---|
| 4,246,950 A | * | 1/1981 | Welter | B60B 21/10 D12/208 |
| 5,060,510 A | * | 10/1991 | Rousseau | G01M 17/024 73/146 |

FOREIGN PATENT DOCUMENTS

| | | | |
|---|---|---|---|
| DE | 9111582 | * | 2/1992 |
| GB | 2033311 | * | 5/1980 |
| KR | 20-0252730 A | | 4/2002 |
| WO | WO 2007/134556 | * | 11/2007 |

OTHER PUBLICATIONS

Machine translation of DE 9111582, 1992.*

* cited by examiner

*Primary Examiner* — Justin R Fischer
(74) *Attorney, Agent, or Firm* — Morgan, Lewis & Bockius LLP

(57) ABSTRACT

An insert rubber for improving aerodynamics of a tire and an installation method thereof, and provides an insert rubber for improving aerodynamics of a tire and an installation method thereof, in which, by eliminating a space which is located between a bead of a tire and a flange of a rim, airflow is prevented from being introduced between the bead and the flange while a vehicle travels, and the space between the bead and the flange is filled with the insert rubber, thereby preventing turbulence from being generated in the space between the bead and the flange.

12 Claims, 11 Drawing Sheets

INSERT RUBBER FOR IMPROVING AERODYNAMICS OF TIRE AND INSTALLATION METHOD THEREOF

CROSS-REFERENCE TO RELATED APPLICATION

This application claims priority to Korean Patent Application No. 10-2020-0027130, filed on Mar. 4, 2020, which is incorporated herein by reference in its entirety.

BACKGROUND

The present disclosure relates to an insert rubber for improving aerodynamics of a tire and an installation method thereof, and more particularly, to an insert rubber for improving aerodynamics of a tire which reduces the generation of turbulence between the tire and a rim, and an installation method thereof.

DESCRIPTION OF RELATED ART

A vehicle is essentially provided with a tire which contacts the ground and a wheel which connects the tire to the axle. The wheel includes a rim to which the tire is mounted, and a wheel disc which is located inside the rim and connected to the axle. The wheel is classified into a disc wheel, a spider wheel, a spoke wheel, and the like according to the shape of the wheel disc.

Meanwhile, as illustrated in FIGS. 1 and 2 exemplifying the related art, a space 5 is generated between a bead 3 and a flange 4 due to a step between a tire 1 and the rim 2. When a driving wind 6 reaches the space 5 between the bead 3 and the flange 4 while a vehicle travels, turbulence is generated. The air resistance of the vehicle is increased by the turbulence, and noise or strange sounds are generated while the vehicle travels.

The contents described in Description of Related Art are to help the understanding of the background of the present disclosure, and may include what is not previously known to those skilled in the art to which the present disclosure pertains.

SUMMARY

Accordingly, an object of the present disclosure considering the above point is to provide an insert rubber for improving aerodynamics of a tire and an installation method thereof, which may prevent turbulence from being generated in a space between a bead and a flange, thereby reducing the air resistance of a vehicle and preventing noise or strange sounds from being generated while a vehicle travels.

An insert rubber for improving aerodynamics of a tire according to an embodiment of the present disclosure, provided to achieve the object, eliminates a space which is located between a bead of a tire and a flange of a rim, thereby preventing airflow from being introduced between the bead and the flange while a vehicle travels.

In addition, the insert rubber for improving aerodynamics of a tire may include a ring-shaped body whose outer circumferential surface is in direct contact with the bead and inner circumferential surface is in direct contact with the flange, and one end of the ring-shaped body is located above a bead seat of the rim, and the other end of the ring-shaped body may connect the surface of the tire with the end of the flange.

In addition, the outer circumferential surface of the ring-shaped body may have the same curvature as the surface curvature of the bead, and the inner circumferential surface of the ring-shaped body may have the same curvature as the surface curvature of the flange.

In addition, the ring-shaped body may be formed to be increased gradually in thickness from the one end located above the bead seat toward the other end located between the surface of the tire and the flange.

In addition, the other end of the ring-shaped body may have the same width as a distance between the end of the flange and the tire.

In addition, the other end of the ring-shaped body may define a flat inclined surface, when the tire and the rim are viewed along the width direction of the vehicle.

In addition, a wire may be embedded inside the ring-shaped body to be adjacent to the bead seat.

In addition, the wire may be made of the same material as that of a bead wire embedded in the tire, and may be smaller in diameter than the bead wire.

In addition, a contraction and expansion space may be formed between the bead, the bead seat, the flange, and the one end of the ring-shaped body.

An installation method of an insert rubber for improving aerodynamics of a tire according to an embodiment of the present disclosure, provided to achieve the object, includes mounting a ring-shaped body to a rim of a tire so that one end of the ring-shaped body is located at one side of a bead of the tire, mounting the tire to the rim so that the bead is located inside the rim, and injecting air into the rim, and direct contacting the bead and the ring-shaped body to a flange.

In addition, in the injecting of the air into the rim, and the direct contacting of the bead and the ring-shaped body to the flange, the bead and the ring-shaped body may be in direct contact with the flange after passing through a hump formed on the rim.

In addition, in the injecting of the air into the rim, and the closely direct contacting of the bead and the ring-shaped body to the flange, the bead may be seated on the bead seat after passing through the hump formed on the rim, and the ring-shaped body may be located above the bead seat after passing through the hump formed on the rim.

According to the insert rubber for improving aerodynamics of a tire and the installation method thereof according to embodiments of the present disclosure, provided as described above, the space between the bead and the flange is filled with the insert rubber, thereby preventing the turbulence from being generated in the space between the bead and the flange.

DETAILED DESCRIPTION

Figure 1:
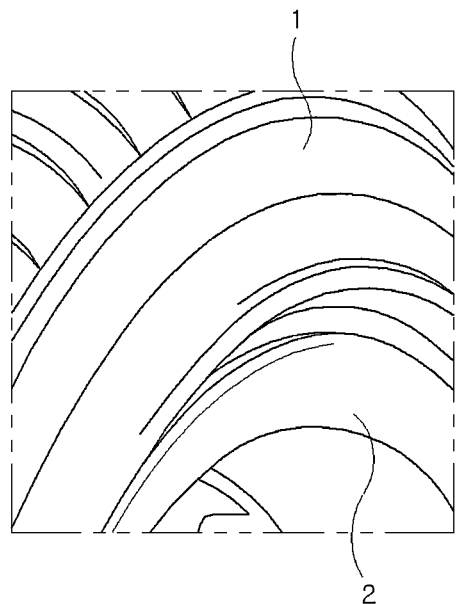
FIG. 1 is an exemplary diagram illustrating a general tire and wheel.
Figure 2:
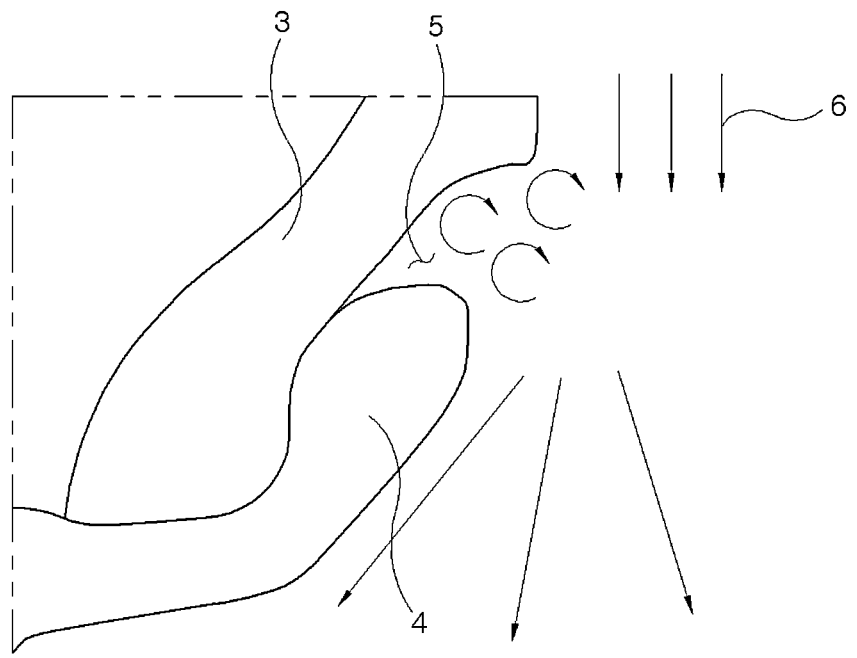
FIG. 2 is an exemplary diagram illustrating the generation of turbulence between a bead and a flange illustrated in FIG. 1.
Figure 3:
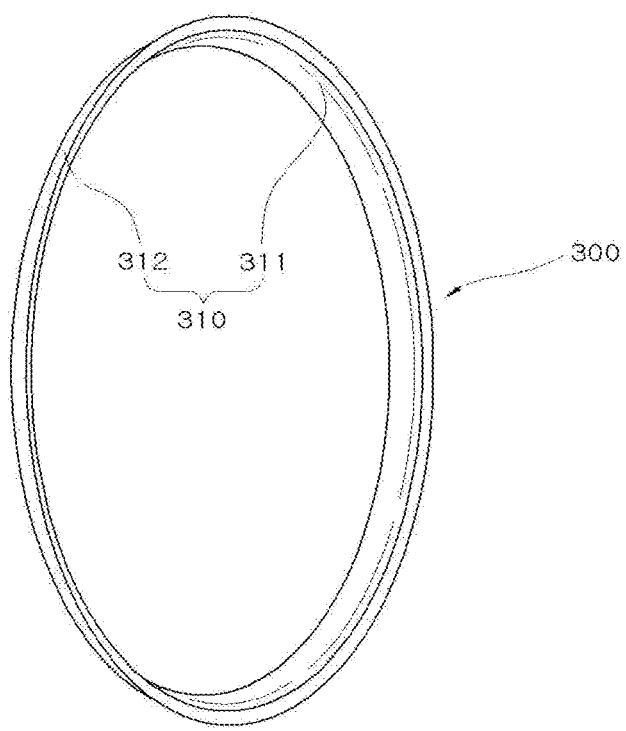
FIGS. 3 to 6 are exemplary diagrams illustrating an insert rubber for improving aerodynamics of a tire according to an embodiment of the present disclosure.
Figure 4:
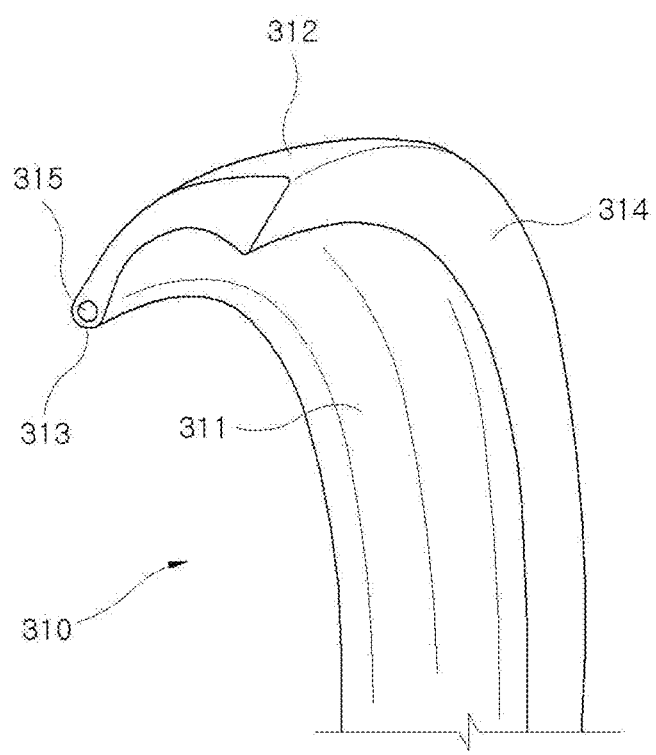
Figure 5:
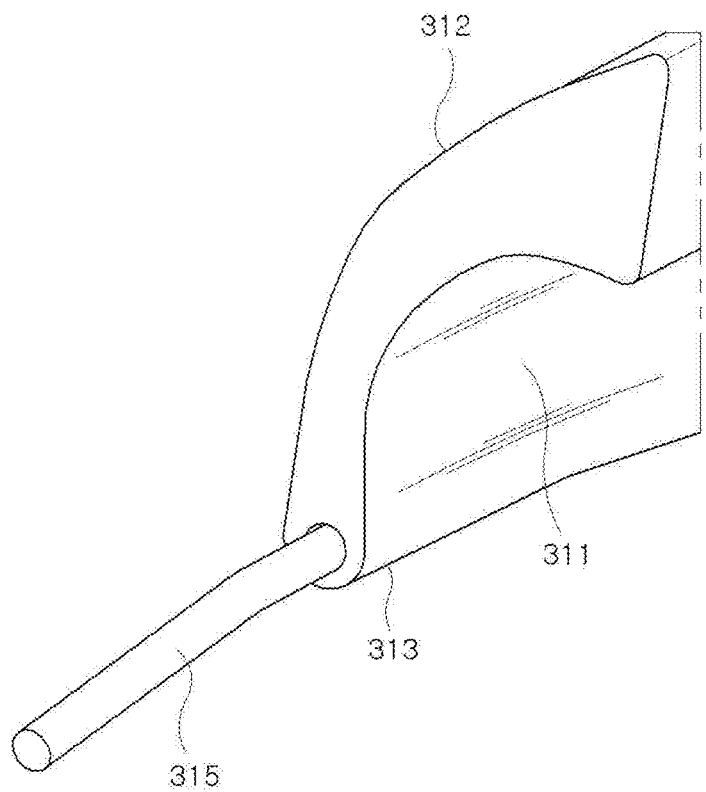

Hereinafter, an insert rubber for improving aerodynamics of a tire and an installation method thereof according to embodiments of the present disclosure will be described.

As illustrated in FIGS. 3 to 8, an insert rubber 300 configured to improve aerodynamics of a tire according to an embodiment of the present disclosure eliminates a space which is located between a bead 110 of a tire 100 and a flange 210 of a rim 200, thereby preventing airflow from being introduced between the bead 110 and the flange 210 while a vehicle travels.

The insert rubber 300 is made of a material similar to the rubber of the sidewall of the tire 100. A shape of the insert rubber 300 is designed in consideration of a matching portion between the tire 100 and the rim 200. The shape of the insert rubber 300 is set to minimize a step portion between the tire 100 and the rim 200.

An embodiment of the present disclosure includes a ring-shaped body 310 whose outer circumferential surface 312 is in direct contact with the bead 110 and inner circumferential surface 311 is in direct contact with the flange 210. One end 313 of the ring-shaped body 310 is located above a bead seat 220 of the rim 200. The other end 314 of the ring-shaped body 310 connects the surface of the tire 100 and the end of the flange 210.

The outer circumferential surface 312 of the ring-shaped body 310 is closer to the longitudinal center axis of the vehicle than the inner circumferential surface 311 thereof. With respect to the vehicle, the outer circumferential surface 312 may be referred to as an inner surface because the outer circumferential surface 312 is close to the center axis of the vehicle, and the inner circumferential surface 311 may also be referred to as an outer surface because the inner circumferential surface 311 is close to the outside of the vehicle.

The outer circumferential surface 312 of the ring-shaped body 310 has the same curvature as the surface curvature of the bead 110. The inner circumferential surface 311 of the ring-shaped body 310 has the same curvature as the surface curvature of the flange 210. The ring-shaped body 310 is formed to gradually increase in thickness from the one end 313 located above the bead seat 220 to the other end 314 located between the surface of the tire 100 and the flange 210.

The other end 314 of the ring-shaped body 310 has a width equal to a distance between the end of the flange 210 and the tire 100. The other end 314 of the ring-shaped body 310 defines a flat inclined surface when the tire 100 and the rim 200 are viewed along the width direction of the vehicle.

A wire 315 is embedded in the ring-shaped body 310 to be adjacent to the bead seat 220. The wire 315 is made of the same material as that of a bead wire 120 embedded in the tire 100. The wire 315 is smaller in diameter than the bead wire 120.

The minimum thickness of the ring-shaped body 310 against the horizontal external force is secured by the wire 315. When the ring-shaped body 310 is contracted by the external force, the minimum thickness thereof may be maintained by the wire 315.

Figure 6:
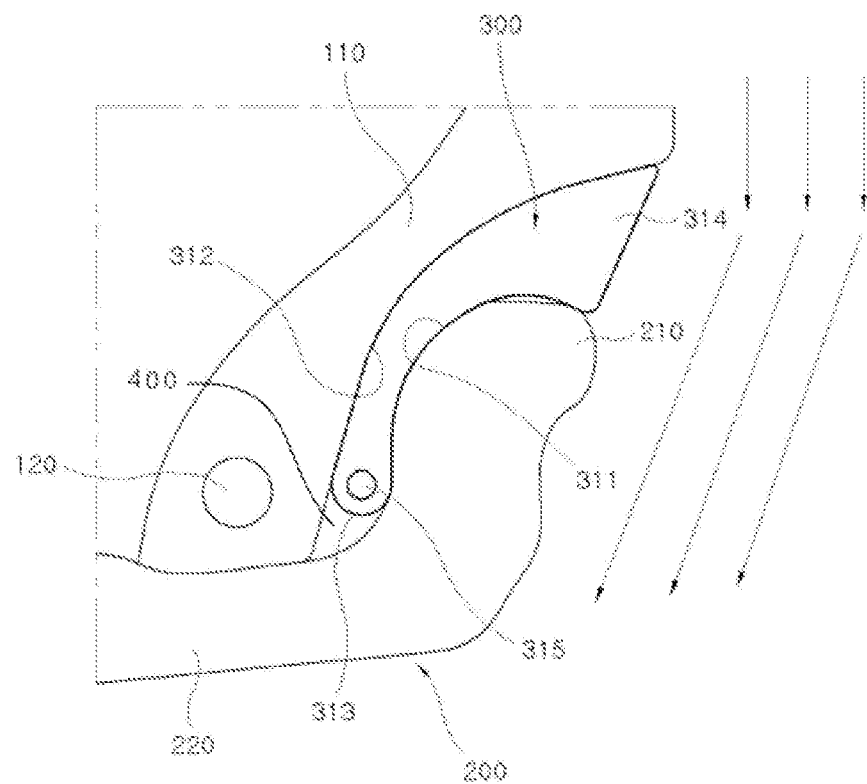
Figure 7:
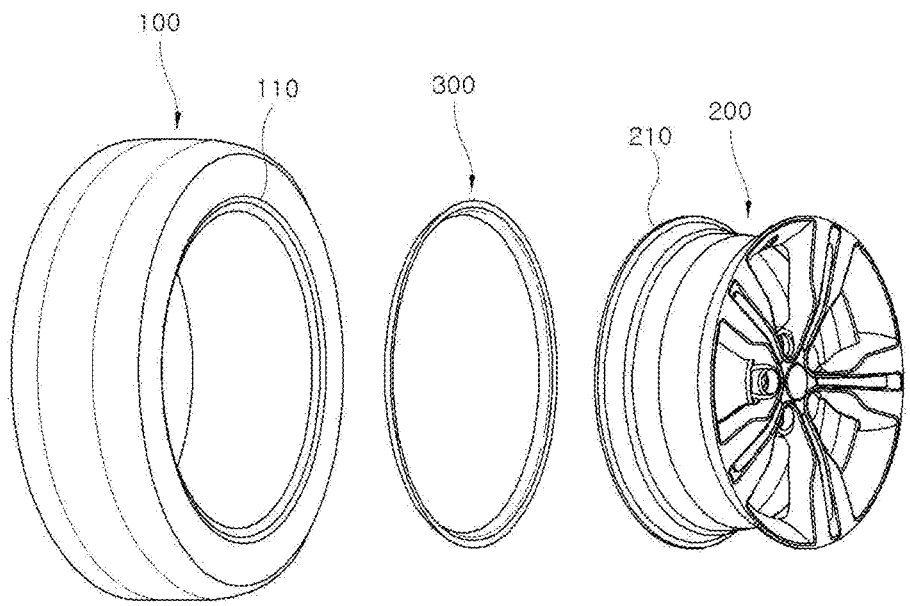
FIG. 7 is an exemplary diagram illustrating the insert rubber, the wheel, and the tire illustrated in FIG. 3.
Figure 8:
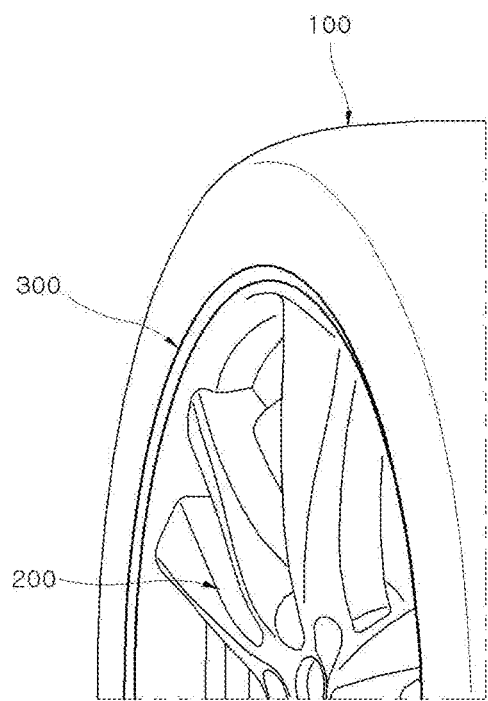
FIG. 8 is an exemplary diagram illustrating a state where the insert rubber illustrated in FIG. 3 is mounted to the wheel.

As illustrated in FIG. 6, a contraction and expansion space 400 is formed between the bead 110, the bead seat 220, the flange 210, and the one end 313 of the ring-shaped body 310. Even if the ring-shaped body 310 is contracted or expanded by the external temperature, the ring-shaped body 310 does not get out of a home position due to the contraction expansion space 400. Particularly, even if the ring-shaped body 310 is deformed, increased in length and decreased in thickness by the external force, the increased or decreased volume of the ring-shaped body 310 may be accommodated by the contraction and expansion space 400.

Figure 9:
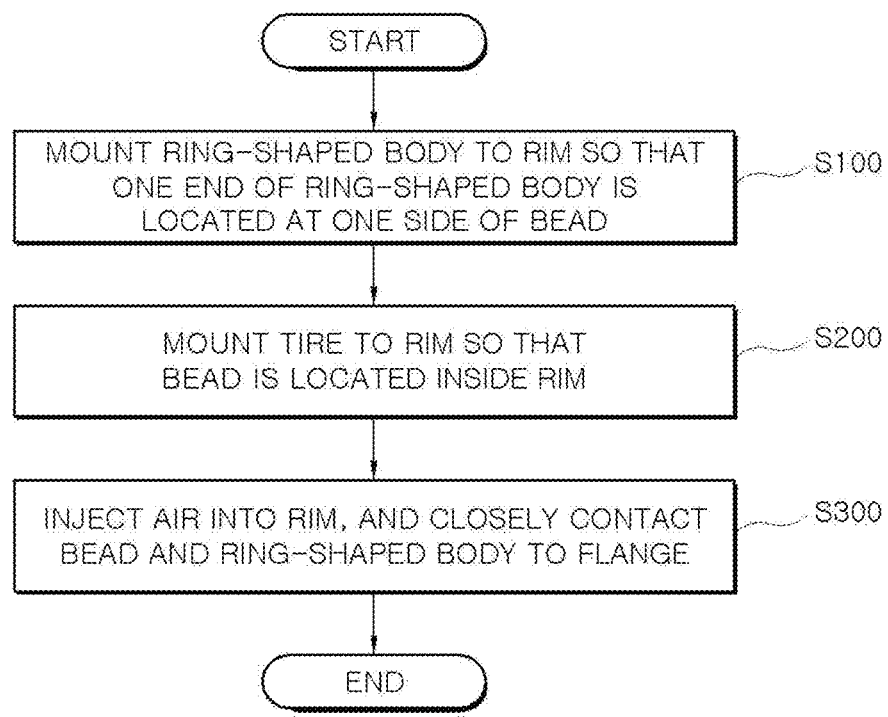
FIG. 9 is a flowchart illustrating an installation method of an insert rubber for improving aerodynamics of a tire according to an embodiment of the present disclosure.

The insert rubber 300 for improving the aerodynamics of the tire 100 according to an embodiment of the present disclosure, configured as described above, is mounted to the wheel according to a flowchart illustrated in FIG. 9.

As illustrated in FIG. 9, an installation method of the insert rubber 300 for improving the aerodynamics of the tire 100 according to an embodiment of the present disclosure includes mounting the ring-shaped body 310 to the rim 200 so that the one end 313 of the ring-shaped body 310 is located at one side of the bead 110 (S100), mounting the tire 100 to the rim 200 so that the bead 110 is located inside the rim 200 (S200), and injecting air into the rim 200, and directly contacting the bead 110 and the ring-shaped body 310 to the flange 210 (S300).

Figure 10:
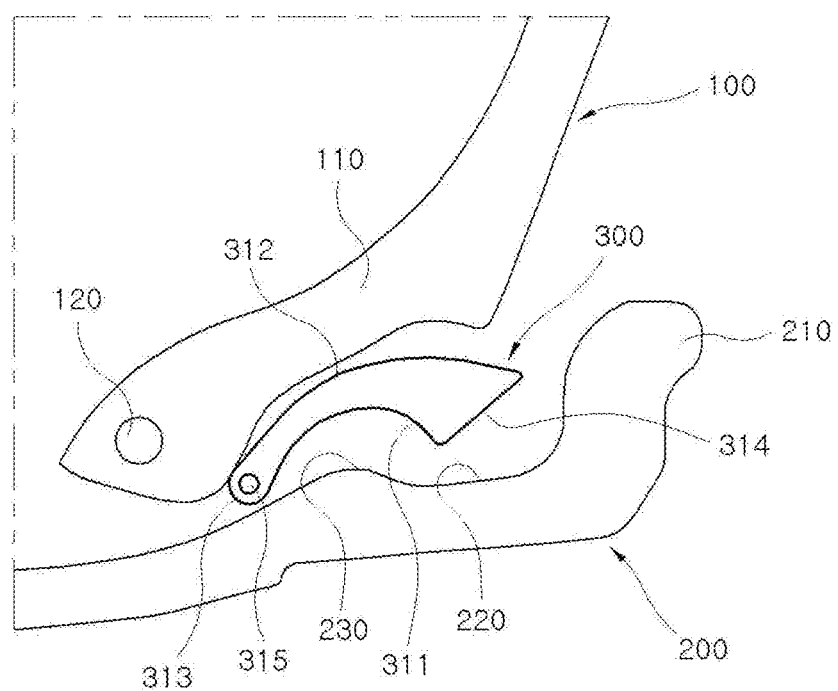
FIGS. 10 and 11 are diagrams illustrating the states where the insert rubber is mounted according to the installation method of an insert rubber for improving aerodynamics of a tire, illustrated in FIG. 9.

As illustrated in FIG. 10, as the mounting of the ring-shaped body 310 to the rim 200 so that the one end 313 of the ring-shaped body 310 is located at one side of the bead 110 (S100), and the mounting of the tire 100 to the rim 200 so that the bead 110 is located inside the rim 200 (S200) are performed, the bead 110 and the one end 313 of the ring-shaped body 310 are located inside a hump 230 of the rim 200.

Figure 11:
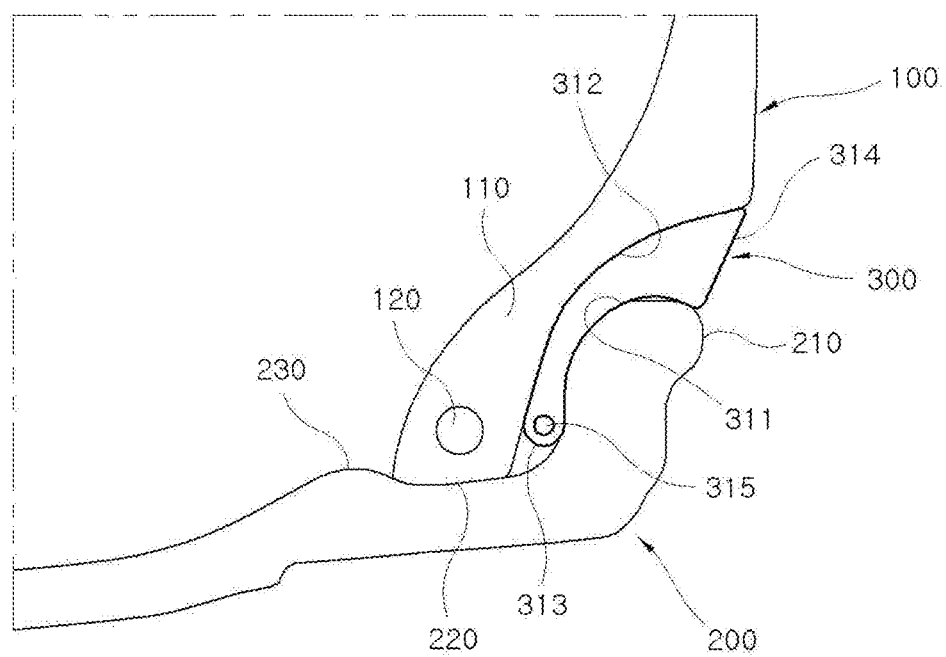

As illustrated in FIG. 11, as the injecting of the air into the rim 200, and the directly contacting of the bead 110 and the ring-shaped body 310 to the flange 210 (S300) is performed, the bead 110 and the one end 313 of the ring-shaped body 310 are in direct contact with the flange 210 after passing through the hump 230 formed on the rim 200. In addition, the bead 110 is seated on the bead seat 220 after passing through the hump 230 formed on the rim 200, and the ring-shaped body 310 is located above the bead seat 220 after passing through the hump 230 formed on the rim 200.

According to the insert rubber 300 for improving the aerodynamics of the tire 100 and the installation method thereof according to an embodiment of the present disclosure, provided as above, the space between the bead 110 and the flange 210 is filled with the insert rubber 300, thereby preventing the turbulence from being generated in the space between the bead 110 and the flange 210.

Figure 12A:
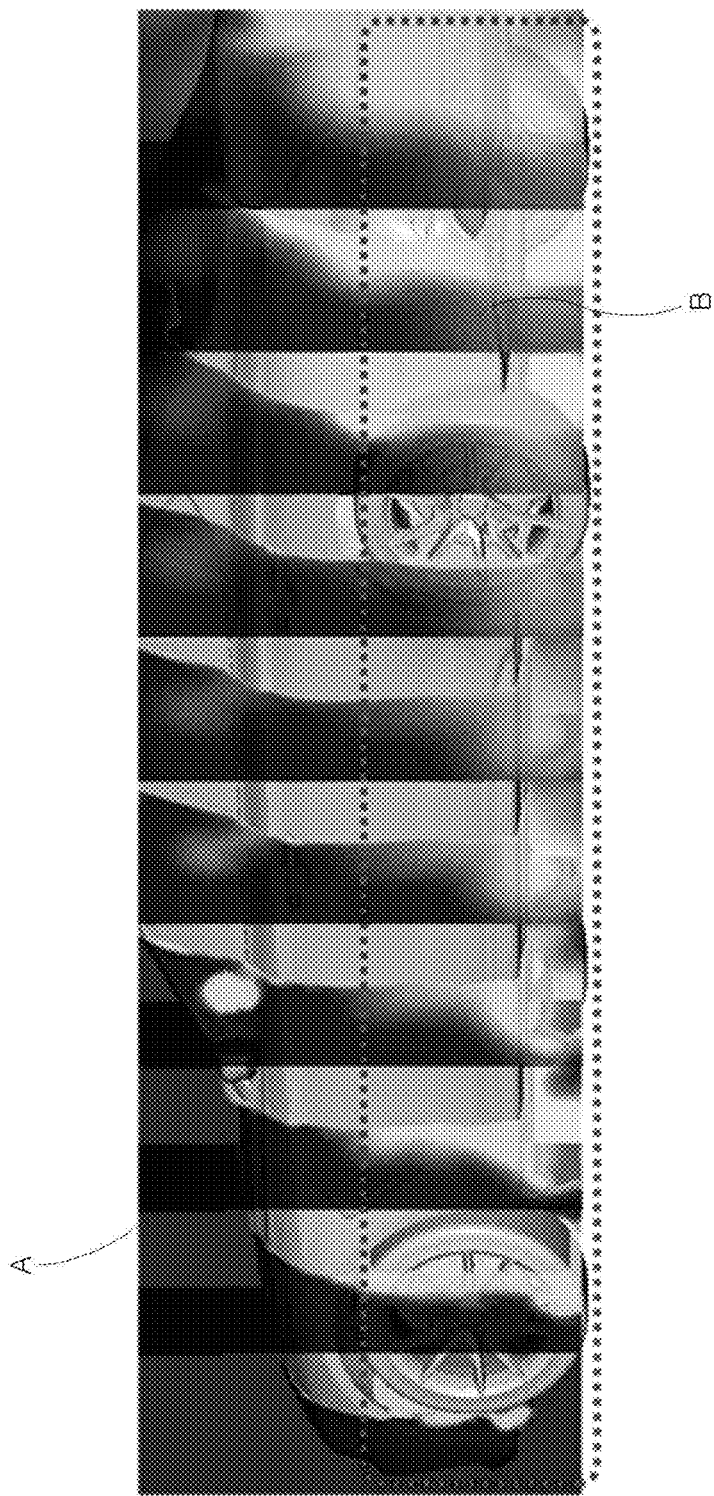
FIGS. 12A and 12B are diagrams illustrating the results obtained by analyzing the airflow around the tire.
Figure 12B:
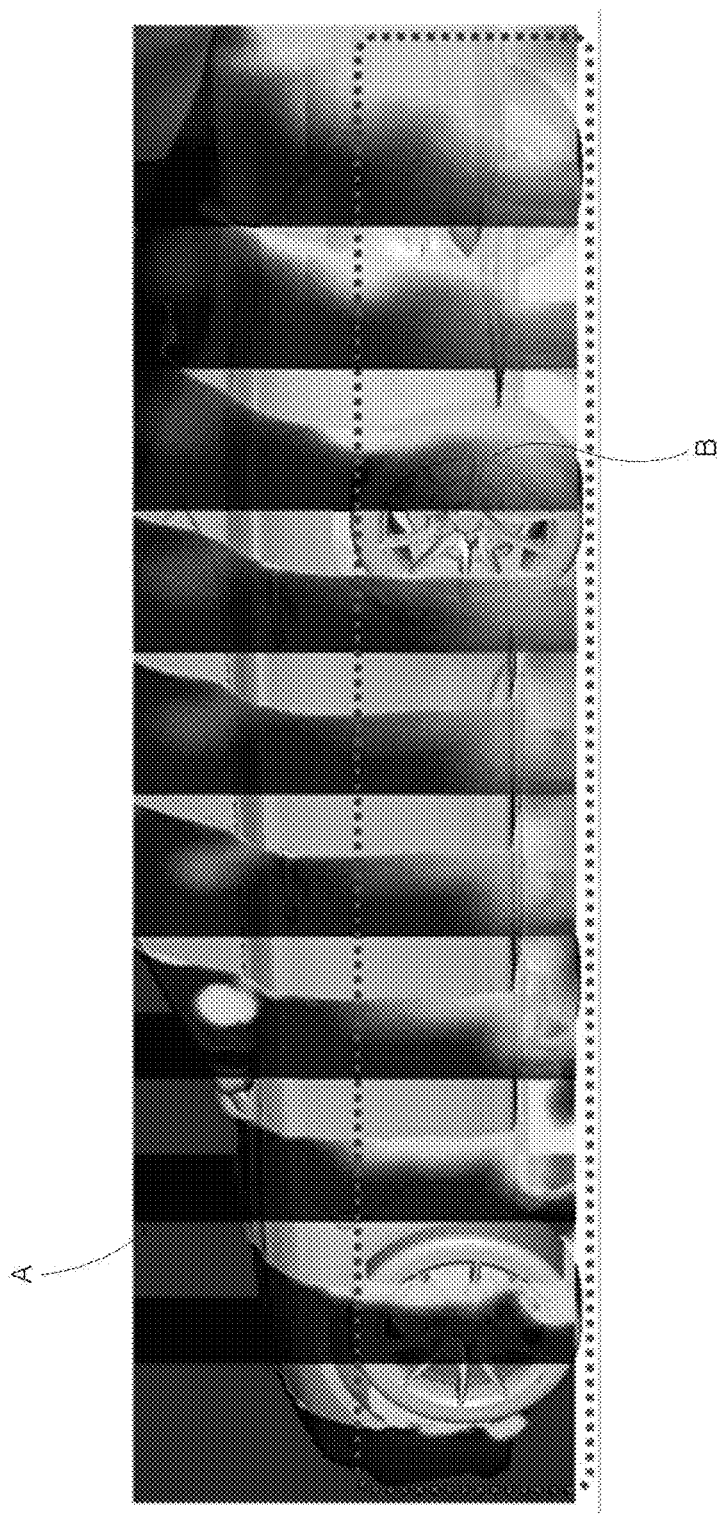

FIGS. 12A and 12B illustrate the results obtained by analyzing the flow of air around the tire.

FIG. 12A illustrates the airflow while a vehicle equipped with a typical tire and wheel travels. FIG. 12B illustrates the airflow while a vehicle travels, to which the insert rubber for improving aerodynamics of a tire according to an embodiment of the present disclosure is applied.

In the partition section along the longitudinal direction of the vehicle 1000 in each of FIGS. 12A and 12B, the air flows at high speed and high pressure in a region A (that is, the upper region of a vehicle 1000) which is expressed darkly, whereas the air flows at low speed and low pressure in a region B (that is, the lower region of the vehicle 1000) which is expressed brightly. In this case, the dashed box shape illustrated in each of FIGS. 12A and 12B shows that as the region B becomes broader, the air resistance becomes greater.

It may be seen that the region B around a front wheel and a rear wheel, illustrated in FIG. 12B, is relatively reduced as compared to FIG. 12A. When an embodiment of the present application is applied, the air resistance is reduced.

In addition, the drag coefficient of the vehicle while the vehicle travels may be mathematically calculated through Equation 1 below. In Equation 1, Cd refers to the drag coefficient, Fair refers to the air resistance, A refers to the projection area, p refers to the air density, and V refers to the vehicle speed.

$$Cd = \frac{F_{air}}{A \times 0.5 \times \rho \times V^2} \quad \text{Equation 1}$$

As compared to FIG. 12A, the drag coefficient in FIG. 12B was reduced by 0.018.

While the present disclosure has been described with reference to the exemplified drawings, it will be apparent to those of ordinary skill in the art that the present disclosure is not limited to the described embodiments, and various changes and modifications may be made without departing from the spirit and scope of the present disclosure. Accordingly, such changes and modifications should belong to the claims of the present disclosure, and the right of the present disclosure should be construed based on the appended claims.

What is claimed is:

1. An insert rubber for improving aerodynamics of a tire,
wherein the insert rubber having a ring-shaped body is arranged between a bead of a tire and a flange of a rim to eliminate a space located between the bead of the tire and the flange of the rim, whereby airflow is prevented from being introduced between the bead and the flange while a vehicle travels,
wherein a contraction and expansion space is provided between an outer surface of the bead, a bead seat on which the bead is seated, the flange, and one end of the ring-shaped body, and when the ring-shaped body is deformed due to an external temperature or force, an increased or decreased volume is accommodated by the contraction or expansion space, respectively, whereby preventing unseating of the ring-shaped body from a home position thereof above the bead seat,
wherein an outer circumferential surface of the ring-shaped body is in direct contact with the bead and an inner circumferential surface of the ring-shaped body is in direct contact with the flange, wherein one end of the ring-shaped body is located on a top of a bead seat of the rim, and wherein the other end of the ring-shaped body occupies a space between a surface of the tire and an end of the flange, and
wherein a wire is embedded inside the ring-shaped body at the one end.

2. The insert rubber of claim 1,
wherein the outer circumferential surface of the ring-shaped body has the same curvature as a surface curvature of the bead, and
wherein the inner circumferential surface of the ring-shaped body has the same curvature as a surface curvature of the flange.

3. The insert rubber of claim 1,
wherein a thickness of the ring-shaped body increases gradually from the one end located on the top of the bead seat toward the other end located between the surface of the tire and the flange.

4. The insert rubber of claim 3,
wherein the thickness of the other end of the ring-shaped body is a distance between the end of the flange and the tire.

5. The insert rubber of claim 3,
wherein the other end of the ring-shaped body defines a flat inclined surface, when the tire and the rim are viewed along the width direction of the vehicle.

6. The insert rubber of claim 1,
wherein the wire comprises a material of a bead wire embedded in the tire, and
a diameter of the wire is smaller than a diameter of the bead wire.

7. A method of installing an insert rubber, the method comprising:
mounting a ring-shaped body to a rim of a tire so that one end of the ring-shaped body is located at one side of a bead of the tire;
mounting the tire to the rim so that the bead is located inside the rim; and
injecting air into the rim, and directly contacting the bead and the ring-shaped body to a flange,
wherein the insert rubber having the ring-shaped body is arranged between the bead of the tire and the flange of the rim to eliminate a space located between the bead of the tire and the flange of the rim, whereby airflow is prevented from being introduced between the bead and the flange while a vehicle travels,
wherein a contraction and expansion space is provided between an outer surface of the bead, a bead seat on which the bead is seated, the flange, and one end of the ring-shaped body, and when the ring-shaped body is deformed due to external temperature or force, an increased or decreased volume is accommodated by a contraction or expansion space, respectively, whereby preventing unseating of the ring-shaped body from a home position,
wherein an outer circumferential surface of the ring-shaped body is in direct contact with the bead and an inner circumferential surface of the ring-shaped body is in direct contact with the flange, wherein one end of the ring-shaped body is located on a top of a bead seat of the rim, and wherein the other end of the ring-shaped body occupies a space between a surface of the tire and an end of the flange, and
wherein a wire is embedded inside the ring-shaped body at the one end.

8. The method of claim 7,
wherein in the injecting air into the rim, the bead and the ring-shaped body are in direct contact with the flange after passing through a hump formed on the rim.

9. The method of claim 7,
wherein in the injecting air into the rim, the bead is seated on the bead seat after passing through a hump formed on the rim, and
the ring-shaped body is located on a top of the bead seat after passing through the hump formed on the rim.

10. A tire including:
an insert rubber;
a bead; and
a rim including a flange,
wherein the insert rubber having a ring-shaped body is arranged between the bead and the flange to eliminate a space located between the bead and the flange, whereby airflow is prevented from being introduced between the bead and the flange while a vehicle travels, wherein the tire includes a contraction and expansion space between an outer surface of the bead, a bead seat on which the bead is seated, the flange, and one end of the ring-shaped body, and when the ring-shaped body is deformed due to an external temperature or force, an increased or decreased volume is accommodated by the contraction or expansion space, respectively, whereby preventing unseating of the ring-shaped body from a home position thereof above the bead seat, wherein an outer circumferential surface of the ring-shaped body is in direct contact with the bead and an inner circumferential surface of the ring-shaped body is in direct contact with the flange, wherein one end of the ring-shaped body is located on a top of a bead seat of the rim, and wherein the other end of the ring-shaped body occupies a space between a surface of the tire and an end of the flange, and wherein a wire is embedded inside the ring-shaped body at the one end.

11. The tire of claim 10, wherein an outer circumferential surface of the ring-shaped body is in direct contact with the bead and an inner circumferential surface of the ring-shaped body is in direct contact with the flange, wherein one end of the ring-shaped body is located on a top of a bead seat of the rim, and wherein the other end of the ring-shaped body occupies a space between a surface of the tire and an end of the flange.

12. The tire of claim 11, wherein the outer circumferential surface of the ring-shaped body has the same curvature as a surface curvature of the bead, and wherein the inner circumferential surface of the ring-shaped body has the same curvature as a surface curvature of the flange.

\* \* \* \* \*